United States Patent
Zadesky et al.

(10) Patent No.: US 9,495,307 B2
(45) Date of Patent: Nov. 15, 2016

(54) CONTEXT AWARE FUNCTIONALITY IN AN ELECTRONIC DEVICE

(71) Applicant: Apple Inc., Cupertino, CA (US)

(72) Inventors: Stephen Zadesky, Portola Valley, CA (US); Fletcher Rothkopf, Los Altos, CA (US); Brian Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/020,777

(22) Filed: Sep. 6, 2013

(65) Prior Publication Data

US 2014/0075051 A1 Mar. 13, 2014

Related U.S. Application Data

(60) Provisional application No. 61/698,496, filed on Sep. 7, 2012.

(51) Int. Cl.
| | | |
|---|---|---|
| *G06F 3/00* | (2006.01) | |
| *G06F 13/12* | (2006.01) | |
| *G06F 9/44* | (2006.01) | |

(52) U.S. Cl.
CPC ................... *G06F 13/122* (2013.01)

(58) Field of Classification Search
CPC .... G06F 13/102; G06F 13/12; G06F 13/122; G06F 9/00; G06F 9/22; G06F 9/226; G06F 21/00; G06F 21/30; G06F 21/44; G06F 21/445; G06F 21/50
USPC ........ 710/3, 8, 62, 305; 455/404.1; 370/315; 717/171; 719/313; 726/4
See application file for complete search history.

(56) References Cited

U.S. PATENT DOCUMENTS

| | | | |
|---|---|---|---|
| 6,745,252 B1* | 6/2004 | Yanagawa et al. | 710/8 |
| 7,003,349 B1* | 2/2006 | Andersson et al. | 607/27 |
| 7,050,783 B2* | 5/2006 | Curtiss et al. | 455/404.1 |
| 7,845,016 B2* | 11/2010 | Diab | H04L 9/3236 713/176 |
| 8,266,349 B2* | 9/2012 | Eaton | A61B 5/0002 370/254 |
| 2001/0052075 A1* | 12/2001 | Feinberg | 713/168 |
| 2004/0177283 A1* | 9/2004 | Madany et al. | 713/300 |
| 2005/0097618 A1 | 5/2005 | Arling et al. | |
| 2006/0168372 A1* | 7/2006 | Smith et al. | 710/62 |
| 2006/0294209 A1 | 12/2006 | Rosenbloom et al. | |
| 2007/0040014 A1* | 2/2007 | Zhao | G07D 11/0066 235/379 |
| 2007/0174520 A1* | 7/2007 | Moon | 710/62 |
| 2008/0101273 A1* | 5/2008 | Everest | 370/315 |
| 2008/0163246 A1* | 7/2008 | Jogand-Coulomb et al. | 719/313 |
| 2009/0112739 A1* | 4/2009 | Barassi et al. | 705/28 |
| 2009/0195350 A1 | 8/2009 | Tsern et al. | |
| 2009/0256717 A1* | 10/2009 | Iwai | 340/825 |
| 2011/0289497 A1* | 11/2011 | Kiaie et al. | 717/171 |
| 2012/0042169 A1* | 2/2012 | Li et al. | 713/182 |
| 2012/0324540 A1* | 12/2012 | Wu | 726/4 |
| 2013/0138859 A1* | 5/2013 | Vecera et al. | 710/305 |
| 2013/0222109 A1* | 8/2013 | Lim | 340/5.8 |

* cited by examiner

*Primary Examiner* — Farley Abad
*Assistant Examiner* — Henry Yu
(74) *Attorney, Agent, or Firm* — Kilpatrick Townsend & Stockton LLP

(57) ABSTRACT

A method for operating a portable electronic device includes receiving an identifier associated with an accessory connected to the portable electronic device. The portable electronic device then determines a set of actions to be performed for that accessory based on the received identifier. The portable electronic device then performs the determined actions.

12 Claims, 9 Drawing Sheets

← 1000

| Identifier ⌐1002 | Name/Model ⌐1004 | Type ⌐1006 | Action(s) ⌐1008 |
|---|---|---|---|
| 3xctr256 | Comp A/ 200XT | Audio | Volume 50%, display playlsits,... |
| tcb45hyt9 | Comp B/ 24wrt | Video | Screen brightness 60%, cinema mode, launch video app... |
| 91-xjr65 | Comp C/ awg89 | Power only | Set charge to 5 volts |

Fig. 10

CONTEXT AWARE FUNCTIONALITY IN AN ELECTRONIC DEVICE

CROSS-REFERENCES TO RELATED APPLICATIONS

This application claims the benefit of U.S. Provisional Application No. 61/698,496 filed Sep. 7, 2012. The contents of which are hereby incorporated by reference in its entirety for all purposes.

BACKGROUND

Portable electronic devices, such as portable media players, have become ubiquitous in today's society. As they have proliferated, so have the number and types of hardware accessories that are designed to interact with these portable media players. These accessories range in complexity from, for example, charger cables to speaker systems to alarm clock docking stations to complex automotive entertainment systems.

Portable electronic devices can be designed to include a number of functions such as a media player, a calendar, an alarm clock, a web browser, and GPS navigation among many other such functions. Examples of a portable electronic device include mobile phones, tablet computers, portable media players, PDA's and the like. Each function supported by a portable electronic device can have various sub-functions or settings associated with it. For example, a media player function can be used to access media stored on the portable electronic device or obtained via the internet. A media player included in a portable electronic device may have other specific sub-functions such as play, stop, forward, reverse, record, etc. The media player function may allow the user to control the output volume of the media being played, adjust equalizer settings, etc. Conventionally, each of the functions available on a portable electronic device is manually accessed by a user of the media device. Also, conventionally settings associated with each function are also accessed manually by the user of the portable electronic device.

In general, for an accessory to be able to interact with or otherwise provide additional functionality for a portable electronic device, the accessory and electronic device need to be able to communicate with each other according to a common protocol. Products that are designed to work seamlessly together and to be deeply integrated with each other can be said to be part of the same digital ecosystem. As a well-known example, Apple's ecosystem includes portable electronic devices such as the iPhone® and the iPad® as well as numerous accessories that bear a label such as "Made for iPhone®" thus informing consumers that the particular accessory was designed to specifically operate with an iPhone. The expected interoperability and quality standards for a given ecosystem may have a strong influence on consumer buying preferences. Thus, it is desirable to ensure that products that are part of a given ecosystem are manufactured to the standards expected of the products. Knock-off, counterfeit and fraudulently manufactured accessories may not be manufactured to the stringent standards expected of the ecosystem and thus may not work properly or may even cause damage to a host portable electronic device.

SUMMARY

Embodiments of the present invention are generally related to electronic devices and accessories to be used with the electronic devices. The accessory may include a unique identifier or serial number, which is received by the portable electronic device upon connection of the accessory with the portable electronic device. Based on the received identifier, the portable electronic device can determine if the accessory is a counterfeit or otherwise unauthorized accessory and/or can configure itself or the accessory to automatically perform one or more functions associated with the identifier.

Some embodiments of the present invention provide a connector that is associated with an accessory. The connector can store a unique identifier. When the accessory is connected to the portable electronic device, the unique identifier is provided to the portable electronic device. The portable electronic device can use the unique identifier and search a list, either stored locally or remotely, to determine if the accessory is counterfeit and/or determine a set of functions associated with that identifier. If the identifier indicates the accessory is counterfeit, the portable electronic device can disable the accessory from interacting with or otherwise being used with the device. If the identifier is associated with one or more predetermined settings or actions, the portable electronic device can then configure itself or the accessory accordingly.

In one embodiment, a method of operating an electronic device is provided. The method includes receiving, by the electronic device, a unique identifier for an accessory connected to the electronic device; determining one or more actions associated with the identifier; and performing the one or more actions. In one embodiment determining the set of actions may include comparing the identifier to a list of identifiers stored in the portable electronic device. In another embodiment method determining the set of actions includes comparing the identifier to a list of identifiers stored in list is external to the portable electronic device, such as a database stored in the cloud. In various embodiments the set of actions performed may include one or more of: initiating functions on the portable electronic device, configuring settings on the portable electronic device, initiating functions on the accessory and configuring settings on the accessory.

In another embodiment, a method of detecting whether an accessory is a counterfeit device is provided. The method includes receiving, by a portable electronic device, a unique serial number for an accessory connected to the portable electronic device; comparing the unique serial number to a list of serial numbers stored in a memory coupled to the portable electronic device; and if the serial number matches a serial number in the list of serial numbers, identifying the accessory as a counterfeit device. Once identified, embodiments of the invention can display a message on the electronic device indicating the accessory is a counterfeit device and/or prevent the counterfeit device from operating with the portable electronic device. In one particular embodiment, further operation of the accessory with the electronic device is prevented by setting one or more contacts of a connector incorporated into the electronic device to an open state.

The following detailed description together with the accompanying drawings will provide a better understanding of the nature and advantages of the present invention.

BRIEF DESCRIPTION OF THE DRAWINGS

FIG. 10 illustrates a table including association data stored in a database according to an embodiment of the present invention;

DETAILED DESCRIPTION

Embodiments of the present invention generally relate to electronic devices and accessories for use with these electronic devices. Specifically, some embodiments provide a method for automatically configuring a portable electronic device upon connection with an accessory. Once the accessory is connected to the portable electronic device, a unique identifier stored in the connector of the accessory can be provided to the portable electronic device. Based on the identifier, the portable electronic device can configures one or more settings of either the accessory of the portable electronic device itself.

One embodiment of the invention provides a portable electronic device that includes various functionalities. Some or all of the available functions of the portable electronic device have one or more settings that can be individually controlled or adjusted to the liking of a user of the portable electronic device. An accessory can automatically invoke certain behavior or programming for some or all of the individual settings of these functions when the accessory is connected to the portable electronic device based on a unique identifier from the accessory. For example, the unique identifier may be used by the portable electronic device to configure a setting or a specific function of the portable electronic device without user intervention.

Another embodiment of the invention provides an accessory that includes at least one function that has one or more settings that can be individually adjusted to the liking of a user. The accessory includes an identification module that stores an identifier unique to the accessory. The portable electronic device can associate the unique identifier with a certain behavior or setting for a function provided by the accessory. Upon connection with the portable electronic device, the accessory can send the unique identifier to the portable electronic device. Based on the unique identifier, the portable electronic device can then program/adjust the settings of the associated function(s) on the accessory.

Figure 1A:
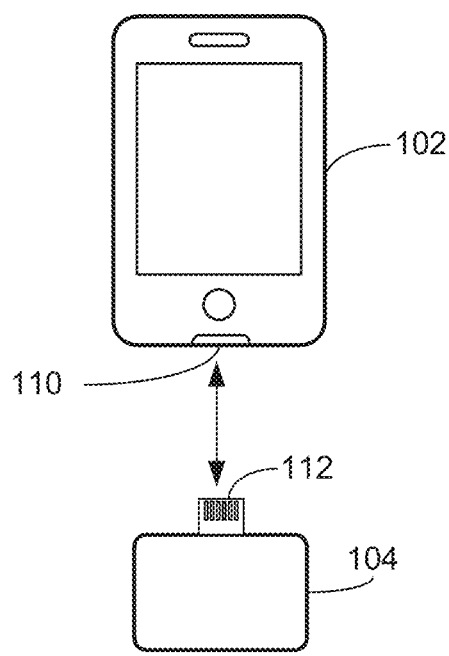
FIG. 1A illustrates a portable electronic device and an accessory according to an embodiment of the present invention.
Figure 1B:
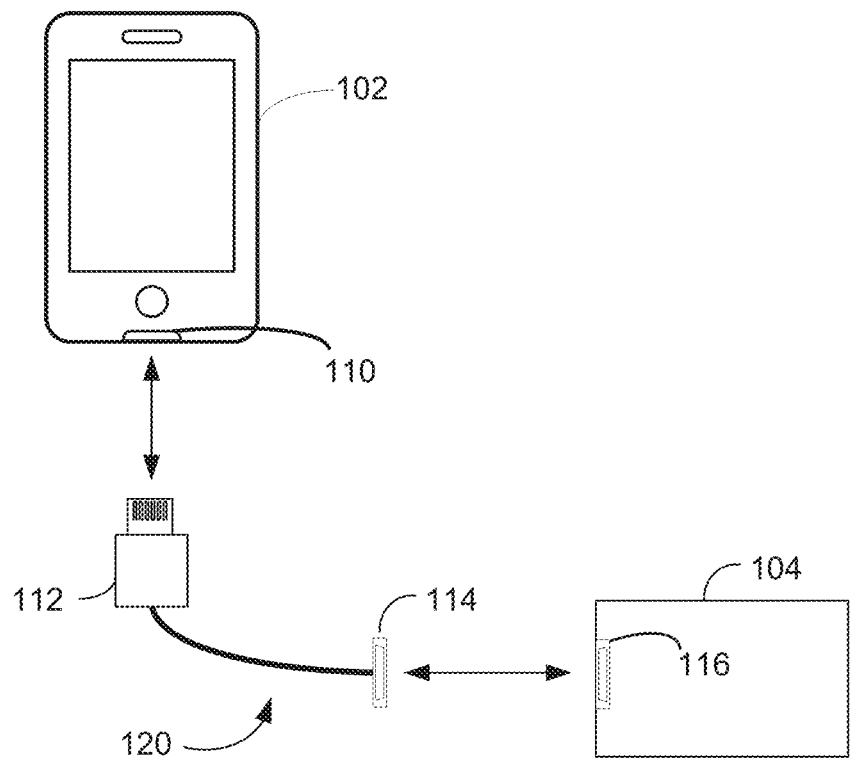
FIG. 1B illustrates a portable electronic device and an accessory connected via a cable according to an embodiment of the present invention.

FIG. 1A illustrates a portable electronic device 102 and an accessory 104. Portable electronic device 102 may include a receptacle connector 110 that can be used to connect portable electronic device 102 with an external accessory, e.g., accessory 104. Accessory 104 may include a complimentary plug connector 112 that can be mated with connector 110 of portable electronic device 102. In some embodiments, connector 112 can be incorporated directly into accessory 104 as illustrated in FIG. 1A. In other embodiments, connector 112 can be part of a cable 120 that includes a second connector 114 that can be connected to accessory 104 via a connector 116 incorporated into accessory 104, e.g., as illustrated in FIG. 1B. Connector pair 114, 116 may be the same type of connector pair as connectors 110, 112 or may be a different type of connector pair that is physically and/or electrically incompatible with connectors 114, 116. In embodiments where connector pair 114, 116 is incompatible with connector pair 110, 112, circuitry (not shown) can be included in one or of connectors 114, 116 to convert signals received through pair 114, 116 to a format that can be used by connector pair 110, 112.

Electronic device 102 can be a digital media player such as iPod®; a mobile communication device such as an iPhone®, Blackberry or similar device; a portable computing device such as an iPad®, an Android compatible device or similar device; a laptop computer, a desktop computer or other electronic device. Moreover, electronic device 102 can provide media player capability, networking, web browsing, e-mail, word processing, data storage, application execution, and/or any other computing or communication functions.

Accessory 104 can be any device capable of communicating with portable electronic device 102 such as, e.g., a charger cable, an external speaker system, an external video device, a multimedia device, a consumer electronic device, a test instrument, a home appliance (e.g., refrigerator or dishwasher), exercise equipment, a security system, a home or office automation system, a camera, a user input device (e.g., keyboard, mouse, game controller), a measurement device, a medical device (e.g., glucose monitor or insulin monitor), a point of sale device, an automobile, an automobile accessory (e.g., a car stereo system or car navigation system), a radio (e.g., FM, AM and/or satellite), an entertainment console on an airplane, bus, train, or other mass transportation vehicle, etc. Any type of device that can be used in conjunction with a user device can be used as an accessory device.

Figure 2:
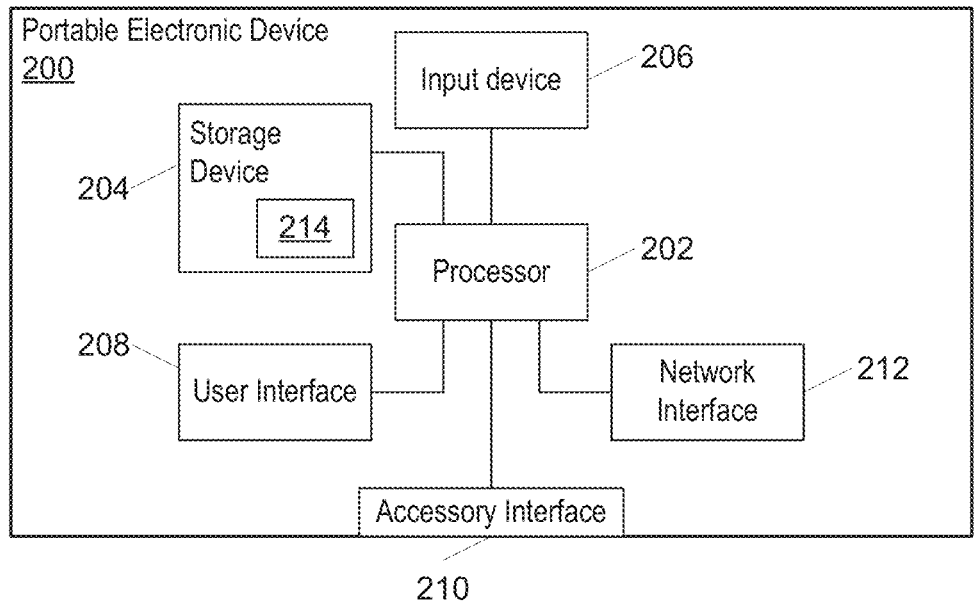
FIG. 2 is a functional block diagram of a portable electronic device according to an embodiment of the present invention.

FIG. 2 is a functional block diagram of a portable electronic device 200 (e.g., implementing portable electronic device 102 of FIG. 1A) according to an embodiment of the present invention. Portable electronic device 200 can include processor 202, storage device 204, input device 206, user interface 208, accessory interface 210, and network interface 212.

Processor 202, which can be implemented as one or more integrated circuits (including, e.g., a single or multi-core microprocessor, multiple single-core or multi core microprocessors, or a microcontroller), can control the operation of portable electronic device 200. For example, in response to receiving an identifier from a connected accessory, processor 202 can configure one or more of the functionalities of the portable electronic device automatically. In addition, processor 202 may also select and playing media assets that may be stored in stored in storage device 204, access various networks (e.g., a mobile telephone network, the Internet, local area network, or the like) to communicate and/or retrieve data using network interface 212, execute various application programs (e.g., applications) 214 residing on storage device 204, and so on. Processor 202 can also manage communication with accessories via accessory interface 210.

Storage device 204 may be implemented, e.g., using disk, flash memory, or any other non-volatile and/or non-transitory storage memory. Storage device 204 can store application programs 214 that are executable by processor 202, system programs, and other program code (not explicitly shown) that can be used in managing communication with various accessories. In some embodiments, storage device 204 can also store media assets such as audio, video, still images, or the like, that can be played by portable electronic device 200, along with metadata describing the media assets (e.g., asset name, artist, title, genre, etc.), playlists (lists of assets that can be played sequentially or in random order), and the like. Storage device 204 can also store any other type of information such as information about a user's contacts (names, addresses, phone numbers, etc.), scheduled appointments and events, notes, information about all accessories used with portable electronic device 200, information about all applications installed on portable electronic device 200 including any that were later removed from portable electronic device 200, and/or other personal information.

Input device 206 can include one or more capture devices such as a barcode reader, a radio frequency identifier (RFID) tag reader, a camera, an infrared scanner, etc. In some embodiments, accessory interface 210 can also act as input device 206. In this instance, an accessory may communicate with portable electronic device 200 via accessory interface 210 to provide input that can be used to configure a setting of a particular function provided by portable electronic device 200.

User Interface 208 can include input controls such as a touch pad, touch screen, scroll wheel, click wheel, dial, button, keypad, microphone, etc., as well as output devices such as a display screen, indicator lights, speakers, headphone jacks, etc., together with supporting electronics (e.g., digital-to-analog or analog-to-digital converters, signal processors or the like). A user can operate the various input controls of user interface 208 to invoke the functionality of portable electronic device 200 and can also view and/or hear output from portable electronic device 200 via user interface 208.

Accessory interface 210 can include a number of signal paths configured to carry various signals between portable electronic device 200 and an accessory. In one embodiment, accessory interface 210 includes a connector that has between 4 and 16 pins arranged in a specific manner as described below. Also, in some embodiments accessory interface 210 includes a connector in which individual pins can be switched by processor 202 or other circuitry to an open or high impedance state such that communication with an accessory over accessory interface 210 is prevented. This feature is particularly useful for embodiments of the invention that are intended to disable communication between a counterfeit accessory and device 200 as described below. It is to be understood that other connectors can also be used. Alternatively or additionally, accessory interface 210 can include a wireless interface (e.g., Bluetooth or the like).

In some embodiments, portable electronic device 200 can also use accessory interface 210 to communicate with a host computer (not shown) that executes an asset management program that can provide media and/or applications for the portable electronic device (for example, iTunes® or Microsoft's application store). The asset management program can enable a user to add media assets and/or applications to portable electronic device 200 and/or remove media assets and/or applications from portable electronic device 200. The user can update metadata associated with media assets on portable electronic device 200. In some embodiments, the user can also interact with the asset management program to create and update playlists and/or applications as well as other documents. In an embodiment, the host computer maintains a master database of media assets and/or applications and can access other databases, for example, through the Internet (including associated metadata and playlists), and the asset management program synchronizes the master database with the database maintained on storage device 204 of portable electronic device 200 automatically whenever portable electronic device 200 connects to the host computer. In other embodiments, portable electronic device 200 can use network interface 212 to communicate with a host computer and/or directly with various other servers to acquire applications, media assets and/or other data. In some embodiments, portable electronic device 200 can also include functionality of the host computer described above. In this instance, user device 200 also functions as the host computer and no additional host computer is needed.

Network interface 212 can provide an interface to one or more communication networks. For example, network interface 212 can incorporate a radio-frequency (RF) transceiver and suitable components for communicating via a mobile communication network such as a mobile telephone network. Additionally or instead, network interface 212 can incorporate a wireless connection to the Internet (e.g., a WiFi transceiver, 3G, 4G, or LTE transceiver or the like), to a personal area network (e.g., a Bluetooth network), or any other network. In still other embodiments, a wired network connection (e.g., Ethernet) may be provided. In some embodiments, the same hardware can be used to support connections to multiple networks; thus, network interface 212 can include analog-to-digital and/or digital-to-analog circuitry, baseband processing components (e.g., codecs, channel estimators, and the like), modulators, demodulators, oscillators, amplifiers, transmitters, receivers, transceivers, internal and/or external antennas, and so on. In some embodiments, some operations associated with network connectivity can be implemented entirely or in part as programs executed on processor 202 (e.g., encoding, decoding, and/or other processing in the digital domain), or a dedicated digital signal processor can be provided.

Application programs (also referred to herein as "applications" or "apps") 214 can include any program executable by processor 202. In some embodiments, certain applications can be installed on portable electronic device 200 by its manufacturer, while other applications can be installed by a user or another accessory. Examples of application programs can include video game programs, personal information management programs, programs for playing media assets and/or navigating the media asset database, programs for controlling a telephone interface to place and/or receive calls, and so on. Certain application programs 214 may provide communication with and/or control of an accessory, and certain application programs 214 may be responsive to control signals or other input from an accessory.

Figure 3:
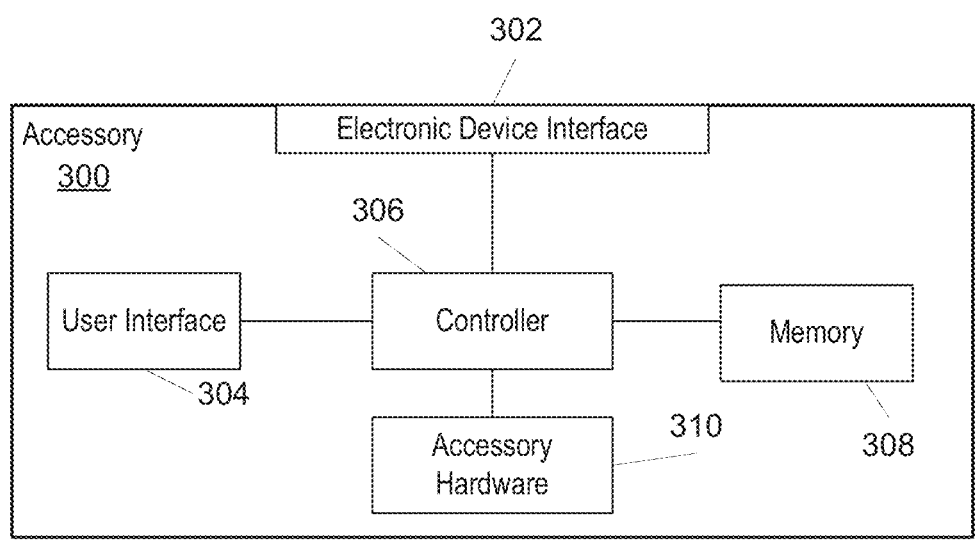
FIG. 3 is a functional block diagram of an accessory according to an embodiment of the present invention.

FIG. 3 is a block diagram of an accessory 300 (e.g., implementing accessory 104 of FIG. 1A) according to an embodiment of the present invention. Accessory 300 can include an electronic device interface 302, a user interface 304, a controller 306, a memory 308, and accessory hardware 310.

Electronic device interface 302 can include a number of signal paths configured to carry various signals between accessory 300 and portable electronic device 200. In one embodiment, electronic device interface 302 can include a plug connector adapted to mate with a complimentary receptacle connector of portable electronic device 200. Details of a particular embodiment of the plug connector and receptacle connector are described below. However, it is to be noted that other connectors can also be used; for example, electronic device interface 302 can include a standard USB or FireWire connector or the like or a 30-pin connector used on iPod®, iPad®, and iPhone® products manufactured and sold by Apple Inc. Alternatively or additionally, electronic device interface 302 can include a wireless interface (e.g., Bluetooth or the like). In some embodiments, electronic device interface 302 may include a cable that is connected to accessory 300 at one end and includes a connector at its other end that can be mated with the connector of portable electronic device 200 (e.g., as illustrated in FIG. 1B). In some embodiments, electronic device interface 302 can store a unique identifier that can be provided to the portable electronic device upon connection with the portable electronic device. The unique identifier can be a numeric or alphanumeric character string that uniquely identifies the accessory associated with portable electronic device interface 302 is incorporated into.

User interface 304 can include input controls, such as a touch pad, touch screen, scroll wheel, click wheel, dial, button, keypad, microphone, probes, etc., as well as output devices, such as a video screen, indicator lights, speakers, headphone jacks or the like, together with supporting electronics (e.g., digital-to-analog or analog-to-digital converters, signal processors or the like). A user can operate the various input controls of user interface 304 to invoke the functionality of accessory 300 and can view and/or hear output from accessory 300 via user interface 304. In addition, in some embodiments, a user can operate portable electronic device 200 (or applications executing thereon) via accessory user interface 304.

Controller 306 can include, e.g., a single-core or multi-core microprocessor or microcontroller executing program code to perform various functions such as digital audio decoding, analog or digital audio and/or video processing, processing of user input, controlling of accessory functionality and the like. Controller 306 can also manage communication with portable electronic device 200 via portable electronic device interface 302.

Memory 308 can be implemented using any type of memory, disk, or other non-volatile and/or non-transitory storage device that can store program code for controller 306 and/or data. For example, memory 308 can store accessory specific software that can provide instructions for controller 306 to interact with accessory hardware, and/or user interface 304. In some embodiments, accessory 300 can receive information (e.g., user input, accessory related information, and/or application information) from portable electronic device 200, and such information can also be stored in memory 308.

Accessory hardware 310 can represent any hardware needed to enable desired functionality of accessory 300. For example, accessory hardware 310 can include charging circuitry that enables accessory 300 to charge electronic device 200 from either a battery that is part of hardware 310 or by an external voltage source, such as a 110 or 220 volt outlet. As another example, accessory hardware 310 may include one or more data gathering devices, such as any type of sensor or meter. In some embodiments, accessory hardware 310 can include an electrical meter that generates data representing electrical characteristics (resistance, voltage difference, or the like), a light sensor that detects light and/or patterns of light, a motion sensor, a temperature sensor, a humidity sensor, a pressure sensor, a chemical sensor that responds to the presence of selected chemicals (e.g., potentially toxic gases such as carbon monoxide), and so on. Accessory hardware 310 can also include one or more medical device such as a glucose meter, respiratory meter, heart rate and/or heart function monitor, blood pressure monitor, or the like.

In some embodiments, accessory hardware 310 that includes a data gathering device can provide one or more electrical signals (e.g., voltage, resistance, and/or current) that correspond to or represent the physical data. Analog and/or digital signals in a variety of formats may be used. Accessory hardware 310 can also include signal processing components that process the signal before sending it to controller 306. In some embodiments, accessory hardware 310 can communicate the electrical signal directly to controller 306, which can process the signal. For example, if accessory specific hardware 310 includes a thermometer implemented using a thermocouple, resistance data from the thermocouple can be converted into temperature data by accessory specific hardware 310, by controller 306, or both. Further, signals representing data gathered by accessory specific hardware 310 can be sent (with or without processing by controller 306) to an application executing on portable electronic device 200, e.g., using an application protocol. Thus, an application executing on portable electronic device 200 can also process data gathered using accessory hardware 310.

In some embodiments, accessory hardware 310 can include one or more computer-controllable devices. Examples of computer-controllable devices include motors, actuators, lights, cameras, valves, speakers, display screens, printers, and/or any other equipment that is controllable by controller 306. In some embodiments, an application executing on portable electronic device 200 can communicate control signals to accessory 300, and controller 306 can operate accessory hardware 310 in response to the control signals.

In some embodiments, accessory hardware 310 can include components of user interface 304. Thus, an application executing on portable electronic device 200 can receive user input from accessory 300, provide output to a user via accessory 300, and/or control, interact with, or respond to any operation accessory 300 is capable of performing.

In some embodiments, accessory hardware 310 can include network and/or communication interfaces. For example, accessory hardware 310 can include an RF receiver (e.g., for FM, AM, satellite radio, and/or other bands) and/or an RF transmitter (e.g., a short-range transmitter for personal use). In other embodiments, accessory hardware 310 can include a communication interface to a personal area network, such as a Bluetooth transceiver or other short-range wireless communication interface. In still other embodiments, accessory hardware 310 can include a telephone interface, GSM, CDMA, and/or other voice and/or data network interfaces. Accordingly, accessory hardware 310 can encompass any hardware component for which interoperability with a portable electronic device may be desirable.

It will be appreciated that the system configurations and components described herein are illustrative and that variations and modifications are possible. The portable electronic device and/or accessory may have other capabilities not specifically described herein. Further, while the portable electronic devices and the accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

As described above, the portable electronic device interface can include a connector that is used to couple the accessory to a portable electronic device. In some embodiments, the portable electronic device interface may include a plug connector that can be mated with a corresponding receptacle connector of a portable electronic device. A particular embodiment of a plug connector and a receptacle connector are now described.

Figure 4:
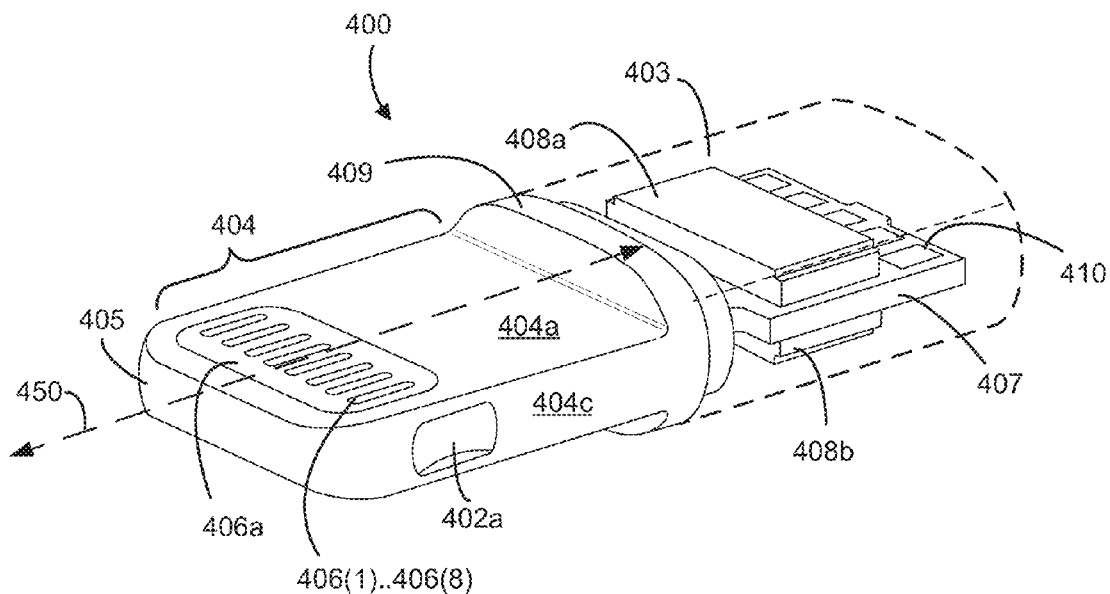
FIG. 4 illustrates a plug connector according to an embodiment of the present invention.

FIG. 4 illustrates a plug connector 400 according to an embodiment of the present invention. Plug connector 400 can be implemented, e.g., as connector 112 of FIGS. 1A and 1B. As described above, plug connector 400 can either be an integral part of accessory 300 or can be part of a cable that is connected to accessory 300. In this instance, the cable can also be considered as a separate accessory.

Connector 400 includes a body 403 and a tab portion 404 that extends away from body 403. In some embodiments, body 403 can be part of accessory 300. Additionally, in some embodiments, accessory 300 may include a cable that extends from the accessory to connector 400 providing more flexibility for connector 400 to be mated with a portable electronic device. Tab 404 is sized to be inserted into a corresponding receptacle connector, such as receptacle connector 110 of portable electronic device 102 shown in FIG. 1A, during a mating event and may be symmetric about a longitudinal axis 450, such that it has two orientations that it can be mated with the receptacle connector including a first orientation and a second orientation that is rotated 180 degrees about longitudinal axis 450 relative to the first orientation. Tab 404 includes a first contact region 406a formed on a first major surface 404a and a second contact region 406b (not shown in FIG. 4) formed at a second major surface 404b (also not shown) opposite surface 404a. Surfaces 404a, 404b extend from a distal tip of the tab to a spine 409 that, when tab 404 is inserted into a corresponding receptacle connector, abuts a housing of the receptacle connector or portable electronic device the receptacle connector is incorporated in. Tab 404 also includes first and second opposing side surfaces 404c, 404d that extend between the first and second major surfaces 404a, 404b. In one particular embodiment, tab 404 is between 4-8 mm wide, between 1-2 mm thick and has an insertion depth (the distance from the tip of tab 404 to spine 409) of between 5-10 mm.

The structure and shape of tab 404 can be defined by a ground ring 405 that can be made from stainless steel or another hard conductive material. Connector 400 includes retention features 402a, 402b (not shown) formed as curved pockets in the sides of ground ring 405 that double as ground contacts. Body 403 is shown in FIG. 4 in transparent form (via dotted lines) so that certain components inside the body are visible. As shown, within body 403 is a printed circuit board (PCB) 407 that extends into ground ring 405 between contact regions 406a and 406b towards the distal tip of connector 400. One or more integrated circuits (ICs), such as Application Specific Integrated Circuit (ASIC) chips 408a and 408b, can be operatively coupled to PCB 407 to provide information regarding connector 400 and/or to perform specific functions, such as authentication, identification, contact configuration and current or power regulation. In a particular embodiment, chip 408a can be an identification module and chip 408b can be a power regulation/control module.

As an example, in one embodiment an identification module is embodied within an IC operatively coupled to the contacts of connector 400. The identification module can be programmed with identification and configuration information about the connector and/or its associated accessory that can be communicated to a portable electronic device during a mating event. As another example, an authentication module programmed to perform an authentication routine, for example a public key encryption routine, with circuitry on the host device can be embodied within an IC operatively coupled to connector 400. The ID module and authentication module can be embodied within the same IC or within different ICs, and in one embodiment the authentication module can be embodied within the identification module.

Bonding pads 410 can also be formed within body 403 near the end of PCB 407. Each bonding pad can be connected to a contact or contact pair within regions 406a and 406b. Wires (not shown) can then be soldered to the bonding pads to provide an electrical connection from the contacts to circuitry within an adapter. In some embodiments, however, bonding pads are not necessary and instead all electrical connections between the contacts and components of connector 400 and other circuitry within the adapter can be made through traces on a PCB that the circuitry is coupled to and/or by interconnects between multiple PCBs within the adapter.

As shown in FIG. 4 eight external contacts 406(1) . . . 406(8) are spaced apart along a single row in contact region 406a. A similar set of eight contacts are spaced apart along a single row in contact region 406b. The two rows of contacts are directly opposite each other and one or more contacts in contact region 406a can be electrically connected to a corresponding contact in contact region 406b on the opposite side of the connector. Contacts 406(1) . . . 406(8) can be used to carry a wide variety of signals including digital signals and analog signals as well as power and ground.

Figure 5:
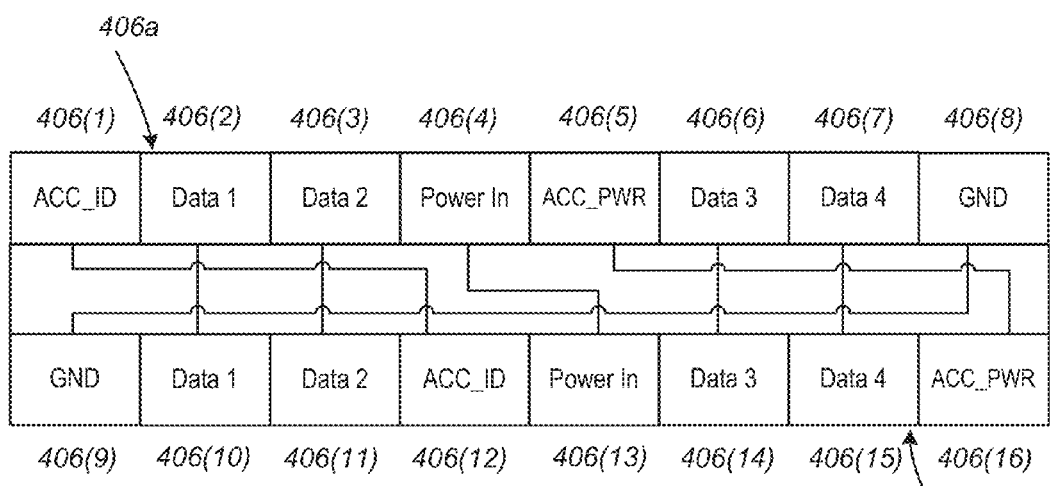
FIG. 5 depicts one particular implementation of a pin-out for connector 400 according to one embodiment of the invention.

FIG. 5 depicts one particular implementation of a pin-out for connector 400 according to an embodiment of the invention. In this embodiment, connector 400 is reversible and each contact in contact region 406a is electrically coupled to a contact in contact region 406b. In other words, depending on how connector 400 is mated with a corresponding receptacle connector, either contacts 406(1)-406(8) or contacts 406(9)-406(16) may be in physical connection with the contacts in the receptacle connector yet the same functionality provided by the set of eight physically coupled contacts is available. The pin-out shown in FIG. 5 includes two contacts 406(4), 406(13) that are electrically coupled together to carry power; accessory ID contacts 406(1), 406(12), accessory power contacts 406(5), 406(16); and two pairs of data contacts including first pair 406(2), 406(10) and 406(3), 406(11), along with second pair 406(6), 406(14) and 406(7), 406(15). Power contacts 406(4), 406(13) can be sized to handle any reasonable power requirement for a portable electronic device, and for example, can be designed to carry between 3-20 Volts from an accessory to charge a portable electronic device connected to connector 400. Power contacts 406(4), 406(13) are positioned in the center region of contact regions 406a, 406b to improve signal integrity by keeping power as far away as possible from the sides of ground ring 405.

Accessory power contacts 406(5), 406(16) can be used for an accessory power signal that provides power from the host to an accessory. The accessory power signal is typically a lower voltage signal than the power in signal received over contacts 406(4), 406(13), for example, 3.3 volts as compared to 5 volts or higher. Accessory ID contacts 406(1), 406(12) provide a communication channel that enables the host device to authenticate the accessory and enables the accessory to communicate information to the host device about the accessory's capabilities as described in more detail below.

Data contact pairs 406(2), 406(10) and 406(3), 406(11) along with 406(6), 406(14) and 406(7), 406(15) can be used to enable communication between the host and accessory using one or more of several different communication protocols. For example, data contacts 406(2) and 406(3) are positioned adjacent to and on one side of the power contacts, while data contacts 406(14) and 406(15) are positioned adjacent to but on the other side of the power contacts. The data contacts can be high speed data contacts that operate at rate that is two or three orders of magnitude faster than any signals sent over the accessory ID contact which makes the accessory ID signal look essentially like a DC signal to the high speed data lines.

Figure 6:
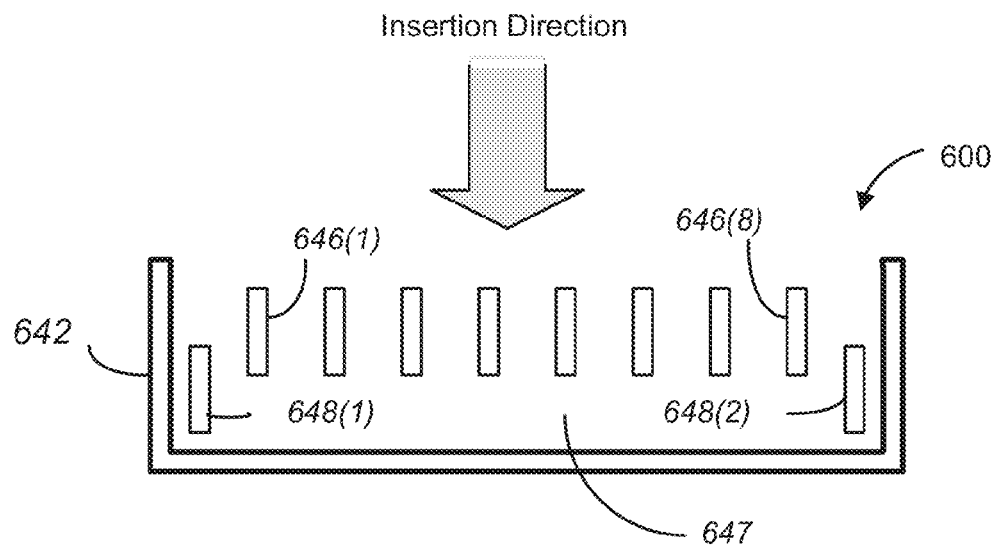
FIG. 6 depicts cross-sectional view of one embodiment of a receptacle connector that the plug connector can be coupled with, according to an embodiment of the present invention.

FIG. 6 depicts cross-sectional view of one embodiment of a receptacle connector 600 that connector 400 can be coupled with. Receptacle connector 600 can be implemented as, e.g., connector 110 of portable electronic device 102 of FIG. 1A. As shown in FIG. 6, receptacle connector 600 includes eight contacts 646(1) . . . 646(8) that are spaced apart in a single row. The contacts are positioned within a cavity 647 that is defined by a housing 642. Receptacle connector 600 also includes side retention mechanisms (not shown) that engage with retention features 402a, 402b in connector 400 to secure connector 400 within cavity 647 once the connectors are mated. Receptacle connector 600 also includes two contacts 648(1) and 648(2) that are positioned slightly behind the row of signal contacts and can be used to detect when connector 400 is inserted within cavity 647 and detect when connector 400 exits cavity 647 when the connectors are disengaged from each other. In one embodiment, there is a switch (not shown) for each of contacts 646(1) . . . 646(8) that is initially set to an open state until circuitry connected to contacts 648(1) and 648(2) detects that connector 400 has been fully inserted within cavity 647. At that time the switch for a single contact is closed enabling a handshaking algorithm to take place over the contact to authenticate the accessory. If the accessory is properly authenticated, additional switches can activate other ones of or all of contacts 646(1) . . . 646(8) depending on whether which contacts the accessory requires.

When tab 404 of connector 400 is fully inserted within cavity 647 of receptacle connector 600 during a mating event between the plug and receptacle connectors, each of contacts 406(1) . . . 406(8) or contacts 406(9) . . . 406(16) from one of contact regions 406a or 406b are physically coupled to one of contacts 646(1) . . . 646(8) depending on the insertion orientation of connector 400 with respect to connector 600. Thus, for example, contact 646(1) may be physically connected to either contact 406(1) or 406(16) depending on the insertion orientation; data contacts 646(2), 646(3) will connect with either data contacts 406(2), 406(3) or with data contacts 406(14), 406(15) depending on the insertion orientation, etc.

As described above, an accessory can store a unique identifier, e.g., in the identification module of the plug connector described above. The identifier can be used by the portable electronic device to initiate certain actions when the accessory is connected to the portable electronic device. Several examples are provided below to illustrate this behavior. It is to be noted that the examples provided below are not exhaustive and are used merely to help explain the various embodiments of the invention. The examples should not be read to narrowly construe the invention. One skilled in the art will realize that there are many other ways to control operation of the portable electronic device using the identifier.

In one embodiment, the accessory can be a cable that includes connector 400 at one of its ends and another connector at the other end. The other connector can be any of the conventional connectors currently available or any other connector that may be available in the future. The other connector may be connected, for example, to a power source, another accessory, or to another external electronic device. The cable can be designated to for use in a particular location, e.g., a bedroom. Certain functionalities can be associated with the cable based on its intended location of use. As described above, connector 400 can include an identification module that stores a unique identifier, e.g., a serial number. In one embodiment device 200 may associate one or more actions with the unique identifier that are to be performed by the portable electronic device once the cable is attached to the portable electronic device. For example, in one embodiment where portable electronic device is a phone, a user may instruct device 200 to enter a "do not disturb" mode where sounds associated with text messages, emails and phone calls are turned off or set to a specific low volume level when device 200 is plugged into the "bedroom" cable that includes connector 400. In another embodiment other actions that can be associated with the identifier of the "bedroom" cable can be dimming of the display of the portable electronic device, launching an alarm application to enable the user to set an alarm, launching a calendar application for displaying the user's upcoming appointments for the next day, launching a media player application and automatically playing media of a particular genre, e.g., Jazz, or the like. It is to be noted that the list of actions provided above is exemplary and the portable electronic device may perform numerous other actions (depending on the type of accessory and capabilities of the portable electronic device) based on detecting that an accessory having the unique identifier has been successfully connected to the device.

In some embodiments, the actions associated with the identifier may depend on the type of accessory. For example, if the accessory is a video cable that carries digital video from portable electronic device to an accessory via a HDMI or a VGA cable, the actions associated with the identifier of the video cable may include one or more of: launching of the media playback application, displaying contents of a folder on the portable electronic device that stores the video files, presenting the user with a list of videos that can be outputted, etc.

Figure 7:
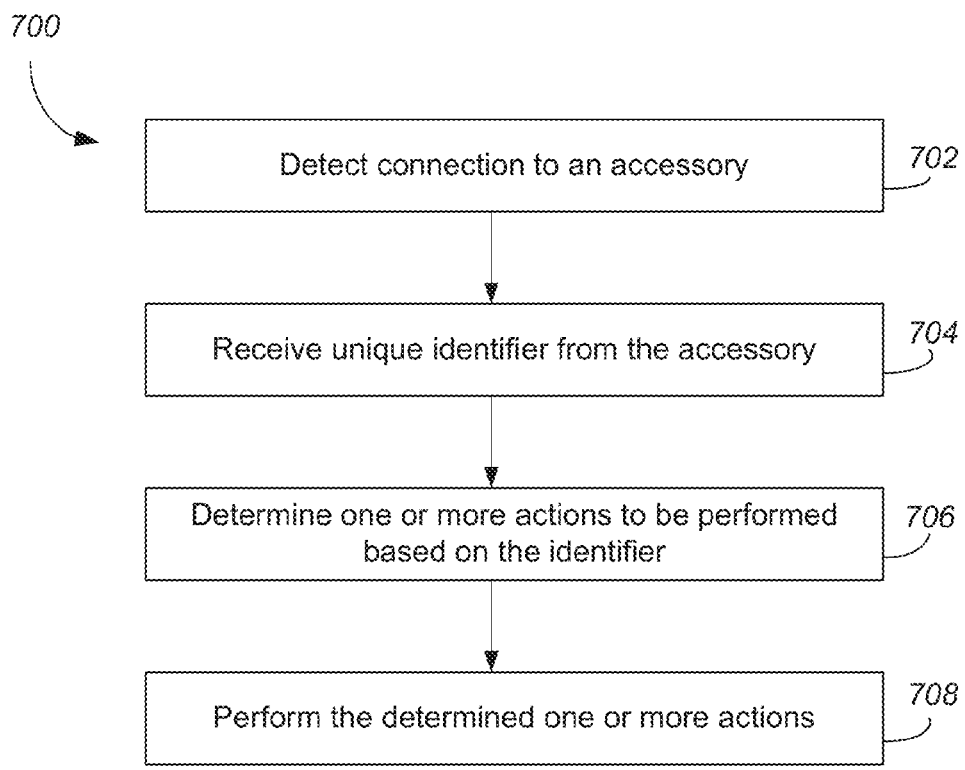
FIG. 7 is a flow diagram of a process for operating a portable electronic device according to an embodiment of the present invention.

FIG. 7 is a flow diagram of a process 700 for operating a portable electronic device according to an embodiment of the present invention. Process 700 can be performed, e.g., by portable electronic device 102 of FIG. 1A or device 200 of FIG. 2. At block 702, the portable electronic device can detect connection of an accessory. This can be done numerous ways including detecting the physical insertion of a connector associated with the accessory (e.g., connector 112) into a connector associated with the portable electronic device (e.g., connector 110), by detecting a voltage level or current on one or more pins of connector 110 or by other known techniques. At block 704, the portable electronic device can receive a unique identifier, e.g., serial number, associated with the accessory. The unique identifier may be received a variety of ways. For example, the identifier may be received as part of an initial handshaking routine that authenticates the accessory to the portable electronic device, may be received in response to a request sent by the portable electronic device for the identifier or may be received in response to the accessory being connected to the portable electronic device independent of an authentication or other validation algorithm.

Based on the received identifier, the portable electronic device can determine whether a set of actions (i.e., one or more actions) is to be performed at block 706. Once the set of actions is identified by the portable electronic device, the portable electronic device can perform or initiate those actions at block 708.

There are several different ways in which the portable electronic device can determine which actions are associated with the identifier (block 706). In one embodiment, the portable electronic device can store a list that includes association information between an identifier and the actions associated with that identifier. The list can be stored in any searchable data structure including a table, a database or the like. The list can also include any reasonable number of entries and will typically include between 0 entries (i.e., before the list is populated with any data) and the number of accessories that the user of a given portable electronic device uses. Since each accessory will have a unique identifier, a set of actions can be selected and associated with that identifier. In this embodiment, when the portable electronic device receives the unique identifier from the accessory, it can search the list to determine whether any actions are associated with that identifier, and if so, thereafter perform those actions or instruct the accessory to perform the actions as appropriate.

In another embodiment, the portable electronic device can communicate with an external device that stores a list to determine the actions to be performed based on the identifier. In this embodiment, the external device can store the same association information described above. In this instance, after the portable electronic device receives the identifier, the portable electronic device can send the identifier to an external system that hosts the list, e.g., a system in the cloud. The external system can then search the list using the identifier and send a list of actions to be performed to the portable electronic device. The portable electronic device can then perform those actions or instruct the accessory to perform the actions as appropriate. Alternatively, the portable electronic device can connect with the external system and search the list to determine a set of actions associated with the identifier.

Communicating with an external device may be beneficial when a user wants a particular accessory to invoke one or more specific functions or device configurations for multiple devices. For example, a user may have a single charger cable that she takes with her on business trips along with a smart phone and a tablet computer, each of which can be charged with the cable. On such trips she may charge one of her smart phone or tablet computer nightly and use the device that is being charged as an alarm clock to wake her up in the morning. An embodiment of the invention allows the user to specify that when either the smart phone or tablet computer are connected to the charger cable an alarm should be set for a particular time at a particular volume level and using a selected sound or playlist. Since this setting has been done on an external list, e.g., a setting stored in the cloud that is associated with an account the user has, if the user gets a new portable media device that is also compatible with the cable, it too can automatically set itself to wake the user up at the particular time, using the particular volume and sound or playlist without being configured to do so independently.

It is to be noted that the methods for determining which actions are to be performed for an identifier described above are exemplary. One skilled in the art will realize that other methods of determining the set of actions can also be used. For example, when an accessory is connected to a portable electronic device for the first time, the accessory can send a list of actions to the portable electronic device along with the identifier. The portable electronic device can then generate association information between the identifier and the list of actions and store that in an internal list. The next time the same accessory is connected to the portable electronic device, the accessory need only send the identifier and the portable electronic device can determine the actions to be performed by consulting the information previously stored in the list.

In some embodiments, the set of actions associated with an identifier can be pre-determined, e.g., by the accessory manufacturer. For example, in the instance where the accessory is a speaker dock, when the speaker dock is connected to the portable electronic device, one of the predetermined actions may be turning up the volume of the portable electronic device to a particular level. Based on the type of accessory and the capabilities of the portable electronic device, certain actions may be pre-programmed for that accessory.

In other embodiments, the user of the portable electronic device may designate a set of actions to be performed for a particular accessory that he/she connects to the portable electronic device. For example, the user may have several accessories that are designed to be used with the portable electronic device. The user may specify a set of actions for one or more of these accessories. For instance, when the user connects an accessory with the portable electronic device, the portable electronic device may present a configuration screen to the user for that accessory. The user can then choose or specify actions that he would like the portable electronic device to perform upon connection with that accessory. The configuration need only be performed once such that the portable electronic device can remember the settings until they are changed by the user. Thereafter, when the accessory is connected to the portable electronic device, the portable electronic device can perform the set of actions automatically, as programmed by the user. At any point the user can change the set of actions by accessing the configuration menu for that particular accessory.

Enabling a portable electronic device to, upon connection to a particular accessory, invoke specific functions and/or settings of either the portable device or accessory enables a great deal of flexibility and convenience. For example, a user may have multiple charging cables, one that is used at home in a bedroom, a second that is used at work and a third that is used for travel. The user may configure his phone to perform non-overlapping or overlapping sets of actions when connected to each of these accessories. For example, the phone can be configured to enter a "do not disturb" mode when connected to the "home" charger cable as described above. The user may have his work area set up so that the charger cable is located right next to his desk chair. Thus, when his phone is connected to the "work" charger cable, the user can configure the settings so that the ringer volume and text message volume is set to a low level while email notices are turned off completely. For the "travel" charger, the user may configure the phone to set a list of the local radio stations that play the user's preferred genre of music when the phone is connected to the charger. For example, an action associated with the "travel" accessory may be to determine the current location of the accessory (and thus the location of the portable electronic device), then determine the local radio stations that play the user's preferred genre of music and set the default or current station accordingly. When the user travels from California to New York and connects the charge/sync cable to his/her portable electronic device in New York, the portable electronic device can read the identifier from the cable and determine that one of the actions is to locate local radio stations playing Jazz music. Since the portable electronic device knows, e.g., based on the identifier, that this is a "travel" accessory, it may first check its location, e.g., using a built-in GPS receiver, and then select local New York radio stations that play Jazz music. If the user then travels to Florida, the portable electronic device determines the local Florida radio stations that play Jazz music. Thus, the user only once has to associate the action of finding local radio stations playing Jazz music with the "travel" cable. Whenever the "travel" cable is used, the portable electronic device can automatically determine the local Jazz radio stations for the current location of the portable electronic device and/or the accessory. This relieves the user from the trouble of finding relevant information in an unknown area.

While each of the examples discussed so far represent embodiments where the portable electronic device sets a function or setting internal to the device based on the serial number of the accessory, in other embodiments the portable electronic device can configure a setting or feature of the accessory. In such embodiments, block 708 includes the additional sub-steps of formulating a command that can be sent from the portable electronic device to the accessory to invoke or change the setting and sending the command. As an example of such an embodiment, a married couple may each own a phone that can be docked in an alarm clock docking station kept on a nightstand by their bed. When docked, each phone can be used to set the time that the alarm goes off as well as whether it is set to music or a buzzer and the volume and other features. On most weekdays the couple needs to wake up at 7:00 am to get to work and get their children to school on time. One or two days a week, however, the wife has early morning meetings and needs to set the alarm for 5:30 a.m. Constantly switching the wake-up times of the alarm clock is tedious so the couple can configure one phone so that when it is docked in the alarm clock, the phone automatically sets the alarm for 7:00 a.m., and set the other phone so that when it is docked in the alarm clock, the phone automatically sets the alarm for 5:30 a.m. In this manner, the couple only needs to choose which phone to dock in the alarm clock nightstand to set the alarm to the desired time. On each occasion when a phone is docked with the alarm clock docking station, the docked phone determines that the serial number of the alarm clock invokes an action to be performed (step 706). As part of performing the action, the phone generates a command that can be sent to the alarm clock docking station to set the desired alarm time. The command generated by one of the phones sets the time to 7:00 a.m., while the command generated by the other phone sets the time to 5:30 a.m. In each case, the command is then sent using whatever communication protocol the phone and accessory (alarm clock) normally communicate with.

Numerous other actions can be associated with the unique identifier/accessory based on the location of the portable electronic device and/or the accessory including but not limited to finding restaurants offering a particular cuisine, posting updates on social media sites, finding places of particular interest, setting reminders for particular tasks, etc. The list of actions provided here is not exhaustive but rather only illustrative in nature. Further, it will be appreciated that process 700 described herein is illustrative and that variations and modifications are possible. Acts described as sequential can be executed in parallel, order of acts can be varied, and acts can be modified or combined.

Figure 8:
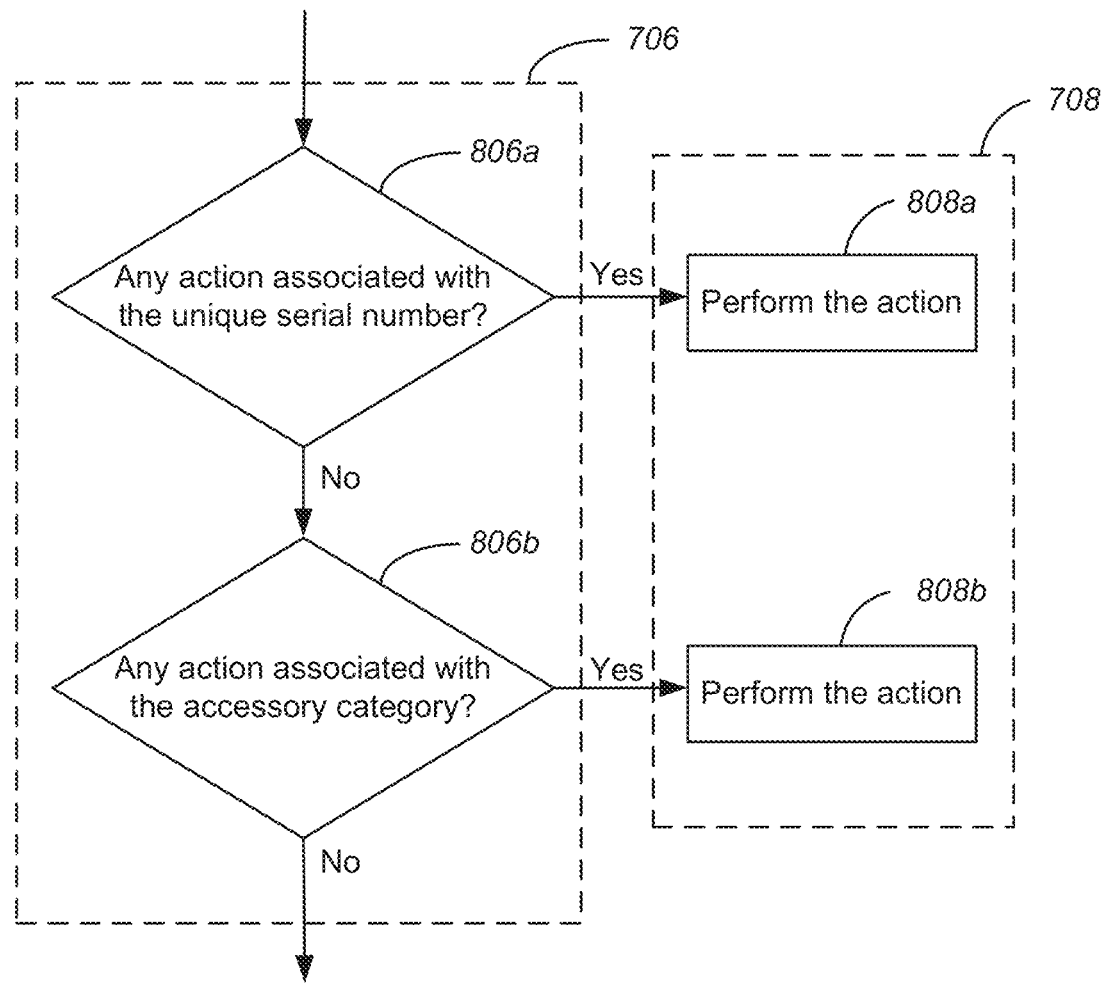
FIG. 8 is a flow diagram of a process for operating a portable electronic device according to another embodiment of the present invention.

In some embodiments, each unique serial number is stored in an identification module embodied in an integrated circuit, such as chip 408a of connector 400. When each identification chip is manufactured, its serial number is linked to a category of accessories, such as "power only", "full data", "audio", "video", etc. and the chip is incorporated into a connector 400 used for such an accessory. This scheme enables embodiments of the invention to set the actions performed in block 708 based on either the unique serial number of the accessory or on the category of the accessory, or on a combination of the serial number and category. For example, as shown in the flowchart of FIG. 8, block 706 may include two sub-steps 806a and 806b. After device 200 receives the unique identifier from step 704, it first determines if the device has been configured to perform any specific actions based on the unique serial number. If so, those actions are performed at block 808a. In block 808b, the device determines whether it has been configured to perform any specific actions based on the category of devices. For example, a user who enjoys music played with high levels of base can configure her media player (device 200) to set the base level accordingly upon being connected to any "audio" device. The same user may desire the mid-range tones to be increased when watching television shows or movies, however, to more easily hear the dialogue. The same user may thus configure her media player to set the mid-range tones at a higher level upon being connected to any "video" device. In various embodiments sub-step 806a can be performed before or after sub-step 806b. In some embodiments, if any actions are associated with the unique serial number in sub-step 806a, sub-step 806b is skipped. In other embodiments, actions set based on the device category are performed in step 806b to the extent they are not overridden by actions to be performed in step 806a.

Figure 9:
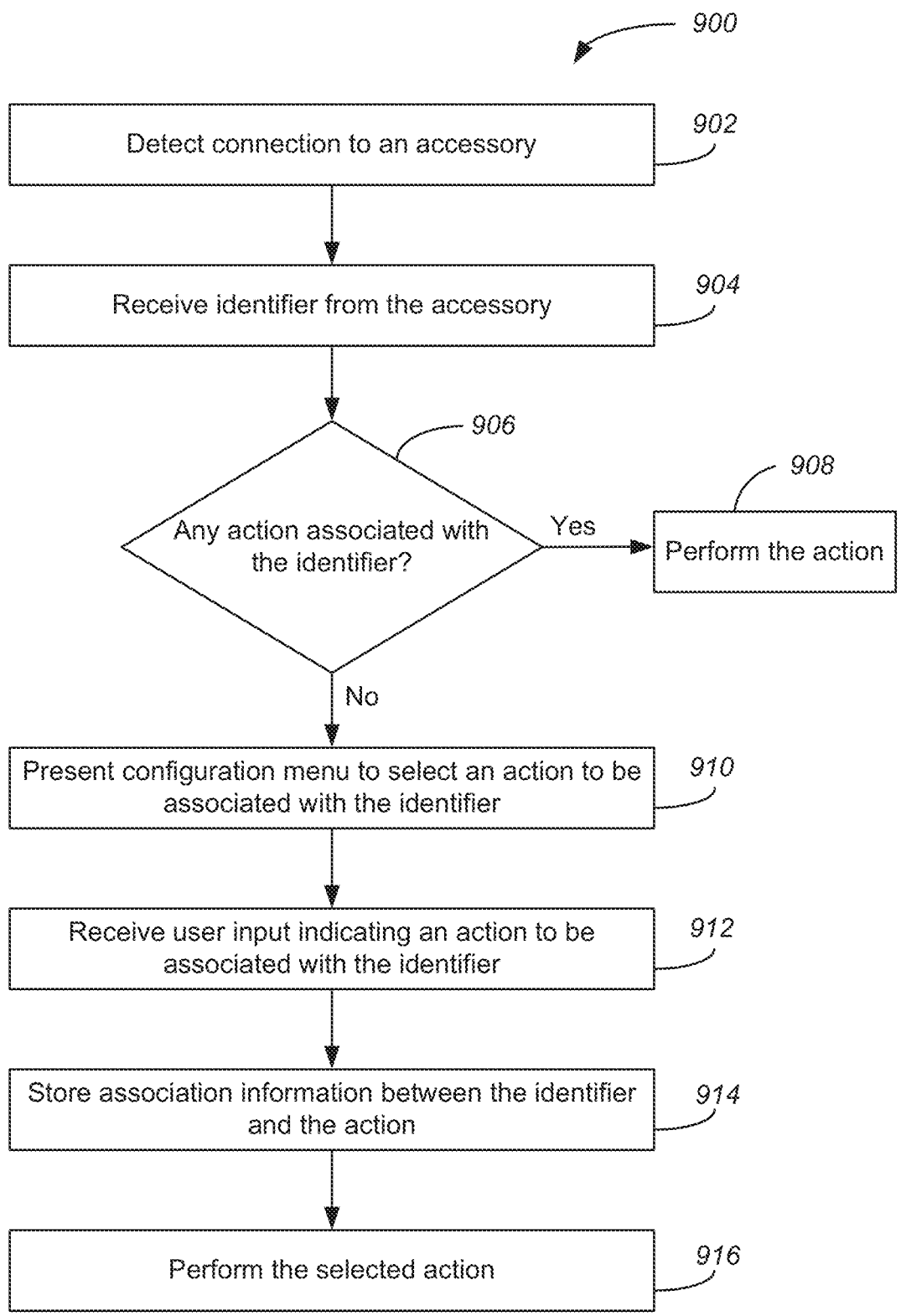
FIG. 9 is a flow diagram of a process for operating a portable electronic device according to another embodiment of the present invention.

FIG. 9 is a flow diagram of a process 900 for operating a portable electronic device according to another embodiment of the present invention. Process 900 can be performed, e.g., by portable electronic device 102 of FIG. 1A.

At block 902, the portable electronic device can detect connection of an accessory. A block 904, the portable electronic device can receive an identifier associated with the accessory. At block 906, the portable electronic device can determine whether there are any actions associated with the identifier. If there are one or more actions associated with the identifier, the portable electronic device can perform those actions at block 908. If there are no actions associated with the accessory, the portable electronic device can present a configuration menu to a user of the portable electronic device at block 910. At block 912, the portable electronic device can receive user input indicating one or more options to be associated with the identifier. At block 914, the portable electronic device stores association information between the identifier and the selected one or more actions in a memory (e.g., in storage device 204 or by sending the information to an external device for storage) and thereafter performs the selected actions at block 916.

It will be appreciated that process 900 described herein is illustrative and that variations and modifications are possible. Acts described as sequential can be executed in parallel, order of acts can be varied, and acts can be modified or combined.

FIG. 10 illustrates a table 1000 including data stored in a database according to an embodiment of the present invention. It is to be noted that the information illustrated in FIG. 10 is exemplary and helps to better explain the embodiments of the invention. One skilled in the art will realize that more or less information than what is illustrated in FIG. 9 may be included in the database.

Table 1000 may include an identifier section 1002 that lists identifiers associated with a plurality of accessories. Since the identifiers are unique, a single identifier is associated only with a single accessory. Section 1004 may include the name and model number of the accessory. Section 1006 may include information about category or type of the accessory, e.g., full data, power only, audio, video, etc. Section 1008 may include a set of actions associated with each identifier. When a portable electronic device receives an identifier, the portable electronic device can consult table 1000 to determine the set of actions associated with the identifier and then perform the set of actions.

As described above, table 1000 may be pre-populated, i.e. the set of actions for each identifier may be predetermined, or the user may be given a choice to select or specify the actions to be associated with an identifier/accessory. The portable electronic device and the accessory may communicate with each other using at least an accessory communication protocol. As long as the portable electronic device and the accessory are connected to each other, the devices can communicate by exchanging commands and data as specified by an accessory communication protocol. The accessory communication protocol can define a format for sending messages between the portable electronic device and the accessory. For instance, the accessory communication protocol may specify that each message is sent in a packet with a header, a payload, and/or a tail. The header can provide basic information such as a start indicator, length of the packet, transaction ID, and a command to be processed by the recipient, while the payload provides any data associated with the command; the amount of associated data can be different for different commands, and some commands may provide for variable-length payloads. The packet can also include a tail that may provide error-detection or error-correction codes, e.g., as known in the art, and/or other information as desired. In various embodiments, the accessory communication protocol can define specific commands to indicate an action to be taken by the recipient, to signal completion of a task, change of state, or occurrence of an error; and/or to identify the nature of the associated data. In some embodiments, the commands may be defined such that any particular command is valid in only one direction.

The accessory communication protocol can also specify one or more physical transport links usable for transmitting signals between devices. For example, the transport link can be a USB link, a UART link, a FireWire link, a Bluetooth link, a WiFi link, a parallel link, a serial link, etc. At this level, the accessory communication protocol can specify, e.g., start bytes, sync bytes, stop bytes, and/or other auxiliary signals. In some embodiments, the accessory communication protocol can provide for multiple alternative transport links. Thus, a single portable electronic device can support communication over a variety of physical links including wired and/or wireless links.

The accessory communication protocol can define a number of "lingoes," where a "lingo" refers generally to a group of related commands that can be supported (or unsupported) by various classes of accessories. In one embodiment, a command can be uniquely identified by a first byte identifying the lingo to which the command belongs and a second byte identifying the particular command within the lingo. Other command structures may also be used. It is not required that all accessories, or all portable electronic devices to which an accessory can be connected, support every lingo defined within the accessory communication protocol or every command of a particular lingo (for instance, different devices might use different versions of a given lingo).

In some embodiments, every accessory and every portable electronic device that are designed to interoperate with each other support at least a "general" lingo that includes commands common to all such devices. The general lingo can include commands enabling the portable electronic device and the accessory to identify themselves to each other and to provide at least some information about their respective capabilities, including which (if any) other lingoes each supports and which capabilities of the other device each intends to use while connected.

The general lingo can also include authentication commands that the portable electronic device can use to verify the purported identity and capabilities of the accessory (or vice versa), and the accessory (or user device) may be blocked from invoking certain commands or lingoes if the authentication is unsuccessful. For example, an authentication manager (not shown) within the portable electronic device can communicate with an authentication controller (also not shown) within the accessory to perform an authentication procedure, e.g., based on public key cryptography and a store of digital certificates maintained within the authentication manager of the portable electronic device.

Figure 11:
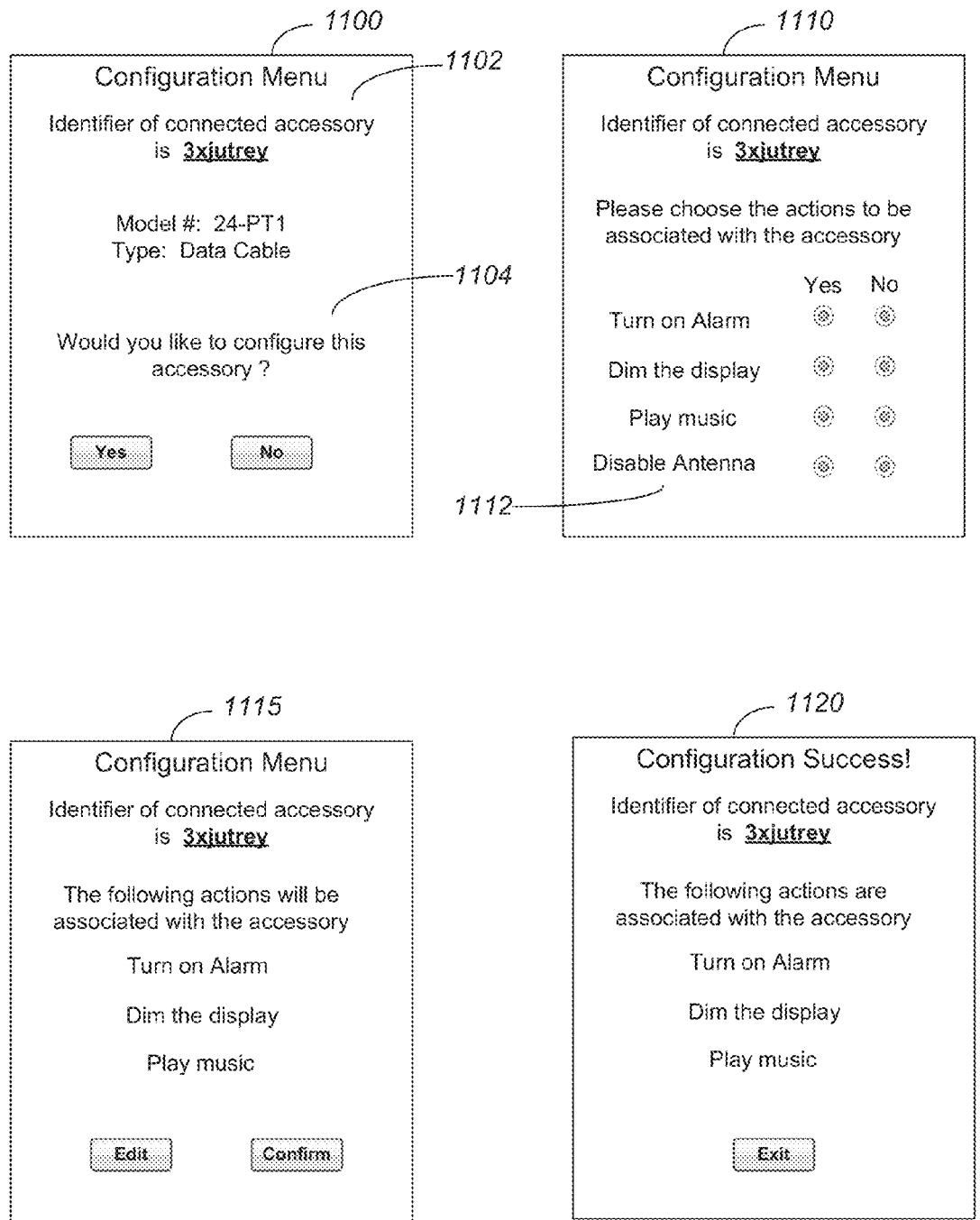
FIG. 11 illustrates screen shots of an application that may be used to configure a set of actions to be associated with an identifier/accessory according to an embodiment of the present invention.

FIG. 11 illustrates screen shots of an application that may be used to configure a set of actions to be associated with an identifier/accessory according to an embodiment of the present invention. As described above, in certain embodiments, the user may be given a choice to configure the accessory and associate a set of actions with the accessory. The screens illustrated in FIG. 10 may be presented on a portable electronic device.

FIG. 11 illustrates an initial or "welcome" screen 1100 that may be presented to a user, e.g., via a user interface of a portable electronic device, once an accessory is connected to the portable electronic device. Screen 1100 may include a section 1102 that displays the identifier of the accessory received by the portable electronic device and a section that displays other information for the accessory such as model number, type of accessory, manufacturer information, etc. Screen 1100 can also provide an option to the user for configuring the accessory in section 1104.

If the user chooses to configure the accessory in screen 1100, the user may be presented with screen 1110. Screen 1110 may include a list of actions 1112 that the user can choose from for the connected accessory. For example, the user can select/deselect an action by clicking a radio button next to the displayed action. In an alternative embodiment, a drop down box may be provided to select an action or the user may specify an action to be associated in a text window. Various other methods for selecting an action are also possible. In some embodiments, based on the identifier of the accessory, the portable electronic device may determine what actions are possible for that accessory and only display those actions on screen 1110. For example, actions associated with a video accessory may be different than actions associated with the "travel" accessory described above. Thus, only the actions relevant to the connected accessory may be displayed on screen 1110. In other embodiments, all available actions may be displayed and the user may be allowed to associate one or more of the actions with the attached "blank" accessory. For example, a cable which otherwise does not have any actions associated with it can be associated with specific actions selected by the user. An association between the unique identifier of the cable and the assigned actions can be stored in the portable electronic device's database.

Based on user selections at the initial screen, the user may be presented with additional selection screens for selecting sub-actions for any of the previously selected action. For example, if the user selects the action 'play music' at screen 1110, the portable electronic device can present another subsequent screen where the user can, e.g., choose a genre of the music, select specific song or songs, select and artist, etc. One skilled in the art will realize that any number of additional configuration options may be presented to the user based on his/her previous choice. After the user selects or specifies all of the desired actions to be associated with the identifier, the user may be presented with a summary screen 1115 listing all his/her choices and providing an opportunity for the user to change any of the choices via an EDIT function or accept the choices. If the user chooses to accept the choices, the user may be presented with screen 1120 confirming that his selection has been saved and that the configuration process is complete. The portable electronic device can then store this information in its database. Thereafter every time the accessory is connected to the portable electronic device, the portable electronic device can determine the set of actions associated with the identifier of the accessory and perform those actions.

It is to be noted that the screen shots illustrated in FIG. 11 are illustrative and one skilled in the art will realize there are many more ways in which the information in FIG. 11 may be presented. Thus, the invention is not limited to the screen shots of FIG. 11. Although the sample screens described above are shown as presenting the information in a visual form, it is not the only way to present the information to the user. In some embodiments, the information shown in sample screens of FIG. 11 can also be presented in an audio form via speakers coupled to the portable electronic device. It is to be noted that many other implementations of the various embodiments described above are possible and the implementations described above and below are in no way intended to limit the scope of the disclosure.

Figure 12:
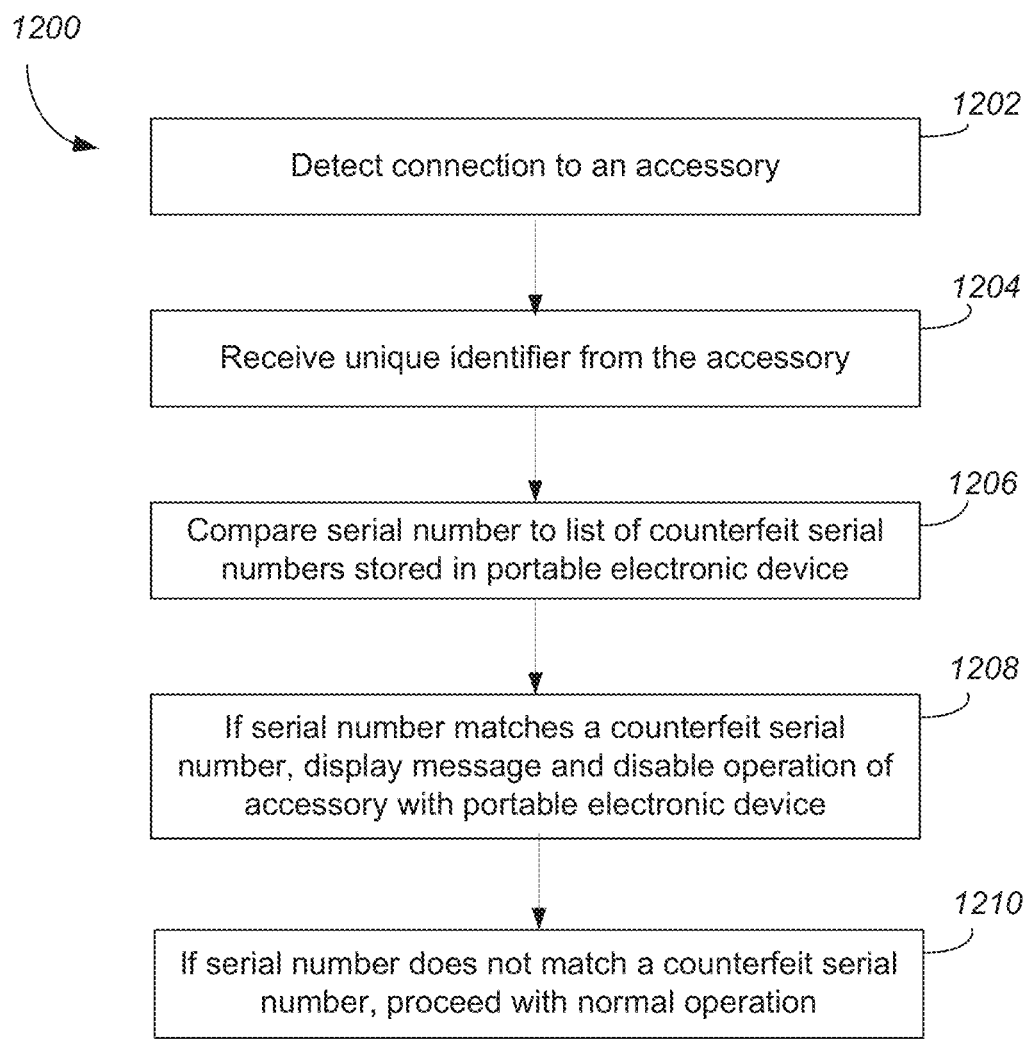
FIG. 12 is a flow diagram of a process for operating a portable electronic device according to an embodiment of the present invention.

FIG. 12 is a flow diagram of a process 1200 for operating a portable electronic device according to another embodiment of the present invention. Process 1200 can be performed, e.g., by portable electronic device 102 of FIG. 1A. Steps 1202 and 1204 are similar to steps 702 and 704 described above with respect to FIG. 7. At block 1202, the portable electronic device can detect connection of an accessory, while at block 1204, the portable electronic device can receive a unique identifier, e.g., serial number, associated with the accessory. Each of these steps can be carried out as described above with respect to steps 702 and 704 in FIG. 7.

At block 1206, the portable electronic device compares the unique identifier (serial number) received in step 1204 to a list of serial numbers known to be counterfeit numbers. For example, in some embodiments of the invention the identification module can be used to authenticate an accessory to portable electronic device using a predetermined handshaking algorithm. In order for the accessory to be authenticated, it must successfully complete the handshaking algorithm by responding to certain commands sent from the electronic device in an expected way. A number of counterfeit devices include counterfeit identification modules that are programmed to participate in and complete the handshaking algorithm using a serial number copied from an authorized identification module. In such instances, the same serial number, which is supposed to be unique, will then be used in hundreds or thousands of unauthorized counterfeit accessories. These serial numbers can be tracked and stored in a list that is used to identify counterfeit devices. In some embodiments, the list can be stored within a memory of portable electronic device 200 (e.g., storage device 204) and can be updated monthly, weekly, daily or at any regular interval or in response to a request to update the list in the same manner that software updates are provided to device 200. In other embodiments the list can be stored external to device 200 similar to the manner in which the identifier unique to each accessory may be stored and searched as discussed above.

If the serial number received at block 1206 matches a known counterfeit number, the portable electronic can display a message informing the user that the accessory is a counterfeit device and/or disable the accessory from further interaction with the portable electronic device. In one embodiment, the message displayed in block 1208 warns the user that the accessory may be counterfeit and recommends that it be disconnected and not used further without taking performing any actions that actually prevent such use. In another embodiment, the message displayed in block 1208 informs the user that the accessory is counterfeit and that it cannot communicate with or otherwise operate with the portable electronic device. Circuitry within the portable electronic device than disables operation of the accessory by, for example, switching the contacts in the electronic device connector to an open state preventing any signals from reaching the device. The contacts can be "re-activated" when another accessory is connected to the device as part of the authentication algorithm as described above.

If the serial number is not on the list of counterfeit serial numbers, and the accessory is successfully authenticated, portable electronic device enables the accessory to be used at block 1210. In some embodiments, the portable electronic device can proceed at this juncture to determine if one or more actions should automatically be performed based on the serial number as described in FIG. 7, blocks 706 and 708.

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa. Also, computer programs incorporating various features of the present invention can be encoded on various non-transitory computer readable storage media; suitable media include magnetic disk or tape, optical storage media, such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Although the invention has been described with respect to specific embodiments and examples, it will be appreciated by those skilled in the art that the invention may be embodied in many other specific forms that vary from the specific described embodiments and examples without departing from the essential characteristics of the invention. For example, while numerous embodiments described above note that the invention is particularly useful for portable electronic devices, such as device 102, embodiments of the invention can also be useful for electronic devices that are not traditionally thought of as portable including desktop computers and similar devices. Those skilled in the art will recognize many equivalents to the specific embodiments of the inventions described herein. Such equivalents are intended to be encompassed by the following claims

What is claimed is:

1. A method of operating an electronic device comprising:
   receiving, by the electronic device, identification information that includes a serial number that uniquely identifies an accessory connected to the electronic device and further identifies a category of the accessory;
   determining that the electronic device has been configured to perform a first set of actions based on the serial number;
   performing the first set of actions;
   determining, from the received identification information, that the electronic device has been configured to perform a second set of actions based on the category of the accessory; and
   performing those actions in the second set of actions that are not overridden by any action in the first set of actions, wherein at least one action in the second set of actions is not included in the first set of actions.

2. The method of claim 1 wherein determining the first set of actions comprises comparing the serial number to a list of serial numbers stored in the electronic device.

3. The method of claim 1 wherein determining the first set of actions comprises comparing the serial number to a list of serial numbers stored external to the portable electronic device to determine one or more actions associated with the identification information.

4. The method of claim 1 wherein the identification information is stored in memory disposed in a connector associated with the accessory.

5. The method of claim 1 wherein at least one of the first set of actions or the second set of actions includes setting a setting on the accessory and the step of performing at least one of the first set of actions or second set of actions includes formulating and sending a command to the accessory to set the setting.

6. The method of claim 1 wherein at least one of the first set of actions or the second set of actions includes setting a setting on the portable electronic device.

7. A portable electronic device comprising:
   a processor;
   a memory coupled to the processor; and
   an accessory communication interface coupled to the processor, wherein the processor in conjunction with the accessory communication interface is configured to:
   receive identification information that includes a serial number that uniquely identifies an accessory connected to the portable electronic device and further identifies a category of the accessory;
   determine that the electronic device has been configured to perform a first set of actions based on the serial number;
   perform the first set of actions;
   determine, from the received identification information, that the electronic device has been configured to perform a second set of actions based on the category of the accessory; and
   perform those actions in the second set of actions that are not overridden by any action in the first set of actions wherein at least one action in the second set of actions is not included in the first set of actions.

8. The portable electronic device of claim 7 wherein the accessory communication interface includes a first connector configured to mate with a corresponding second connector of the accessory; and
   wherein the first connector is further configured to receive the identification information stored in the second connector.

9. The portable electronic device of claim 7 wherein the processor is further configured to access a list to determine at least one of the first set of actions or second set of actions, and wherein the list stores association information between the identification information and one or more actions performable by the portable electronic device.

10. The portable electronic device of claim 7 wherein the first set of actions includes one or more actions associated with one or more capabilities supported by the portable electronic device.

11. The method of operating an electronic device set forth in claim 1 further comprising:
    if the electronic device has not been configured to perform a first set of actions based on the serial number, displaying a configuration menu on the electronic device that enables a user to identify one or more actions to be associated with the accessory and performed when the accessory is subsequently connected to the electronic device;
    receiving, by the electronic device, a selection of one or more actions from the one or more actions;
    generating, by the electronic device, association information between the serial number and the one or more actions; and
    storing the association information in a computer-readable memory within the electronic device.

12. The portable electronic device of claim 7 wherein the processor in conjunction with the accessory communication interface is configured to:

if the portable electronic device has not been configured to perform a first set of actions based on the serial number, display a configuration menu on the portable electronic device that enables a user to identify one or more actions to be associated with the accessory and performed when the accessory is subsequently connected to the electronic device;

receive a selection of one or more actions from the configuration menu;

generate association information between the serial number and the one or more actions; and store the association information in a computer-readable memory within the electronic device.

\* \* \* \* \*